(12) United States Patent
Lim et al.

(10) Patent No.: US 11,086,445 B2
(45) Date of Patent: Aug. 10, 2021

(54) DEVICE AND METHOD FOR CONTROLLING TOUCH DISPLAY, AND TOUCH DISPLAY SYSTEM

(71) Applicant: SK TELECOM CO., LTD., Seoul (KR)

(72) Inventors: Gukchan Lim, Seoul (KR); Yong Woo Bae, Seoul (KR); Dongyoub Sinn, Seoul (KR); Seungmin Seen, Seoul (KR); Seungho Shin, Seoul (KR); Hak-Soon Lee, Seoul (KR); Jinsoo Jeon, Seoul (KR)

(73) Assignee: SK TELECOM CO., LID., Seoul (KR)

( * ) Notice: Subject to any disclaimer, the term of this patent is extended or adjusted under 35 U.S.C. 154(b) by 0 days.

(21) Appl. No.: 16/652,264

(22) PCT Filed: Oct. 1, 2018

(86) PCT No.: PCT/KR2018/011635
§ 371 (c)(1),
(2) Date: Mar. 30, 2020

(87) PCT Pub. No.: WO2019/066614
PCT Pub. Date: Apr. 4, 2019

(65) Prior Publication Data
US 2020/0241724 A1    Jul. 30, 2020

(30) Foreign Application Priority Data
Sep. 29, 2017 (KR) .................. KR10-2017-0127048

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC .. G06F 3/04166; G06F 3/0446; G06F 3/0484; G06F 3/0488; G06F 3/04842; G06F 2203/04808
See application file for complete search history.

(56) References Cited

U.S. PATENT DOCUMENTS 9,207,800 B1 * 12/2015 Eriksson ............... G06F 3/0421
2009/0135162 A1   5/2009 Van De Wijdeven et al.
(Continued)

FOREIGN PATENT DOCUMENTS

JP   2011-258195 A   12/2011
JP   2015-032156 A    2/2015
(Continued)

OTHER PUBLICATIONS

International Search Report issued for corresponding International Patent Application No. PCT/KR2018/011635 dated Jan. 9, 2019, along with an English translation, citing above references.
(Continued)

*Primary Examiner* — Carolyn R Edwards
(74) *Attorney, Agent, or Firm* — Hauptman Ham, LLP

(57) ABSTRACT

A method in accordance with an embodiment is performed by a control apparatus. The method includes obtaining, when applications having a region within which the applications are overlapped with each other are displayed on the touch display device, information that one application of the applications is displayed to cover the other application of the applications or that said one application is displayed to be covered by the other application within the region; determining, based on the obtained information, touch sensing cycles for touch sensors among a plurality of touch sensors
(Continued)

embedded in the touch display device to be different from each other, each of said at least two touch sensors sensing a corresponding part within an entire region where the applications are displayed on the touch display device; and controlling each of said at least two touch sensors to perform a sensing operation based on its touch sensing cycle.

7 Claims, 8 Drawing Sheets

(56) References Cited

U.S. PATENT DOCUMENTS

| | | | | |
|---|---|---|---|---|
| 2009/0189878 | A1* | 7/2009 | Goertz | G06F 3/0425 345/175 |
| 2011/0069018 | A1* | 3/2011 | Atkins | G06F 3/04883 345/173 |
| 2011/0304650 | A1* | 12/2011 | Campillo | G06F 3/0304 345/661 |
| 2013/0234993 | A1* | 9/2013 | Zhang | G06F 3/0421 345/175 |
| 2013/0346924 | A1* | 12/2013 | Morrill | G06F 3/04842 715/863 |
| 2014/0164989 | A1* | 6/2014 | Kuhne | G06F 3/0488 715/790 |
| 2015/0234522 | A1* | 8/2015 | Zhang | G06F 3/0412 345/173 |
| 2015/0309586 | A1 | 10/2015 | Jiang et al. | |

FOREIGN PATENT DOCUMENTS

| | | |
|---|---|---|
| KR | 10-2008-0096975 A | 11/2008 |
| KR | 10-2011-0050345 A | 5/2011 |
| KR | 10-2015-0093708 A | 8/2015 |

OTHER PUBLICATIONS

Written Opinion issued for corresponding International Patent Application No. PCT/KR2018/011635 dated Jan. 9, 2019.

The extended European Search Report dated Apr. 22, 2021 in connection with the counterpart European Patent Application No. 18860894.7.

* cited by examiner

… (1)

DEVICE AND METHOD FOR CONTROLLING TOUCH DISPLAY, AND TOUCH DISPLAY SYSTEM

CROSS REFERENCE TO RELATED APPLICATION

This Application is a National Phase Patent Application and claims priority to and the benefit of International Application Number PCT/KR2018/011635, filed on Oct. 1, 2018, which claims priority to and the benefit of Korean Application No. 10-2017-0127048, filed on Sep. 29, 2017, the entire contents of each of which are incorporated herein by reference.

TECHNICAL FIELD

The present disclosure relates to a method and an apparatus for controlling a touch display device, and a touch display system.

BACKGROUND

A touch interface is used in various fields such as a tablet PC, a PDA, a smartphone, a home interphone, a refrigerator and the like. In addition, such a touch interface is also used in a large display device such as a tabletop display device or a wall display device.

In particular, the large display device will be described. The large display device may include various types of touch interfaces, for example, an LED type touch interface. The LED type touch interface will be described with reference to FIG. 1.

FIG. 1 is a view conceptually illustrating some components of a large display system including an LED type touch interface. Referring to FIG. 1, the large display system 1 includes a touch display device 2 on which an application is displayed and a plurality of sensors which may include light emitting units 3 and 4 including LEDs and light receiving units 5 and 6 for detecting light emitted by the LEDs of the light emitting units 3 and 4.

In the above-mentioned large display system, in order to sense the touch on the touch display device 2, all the light emitting units 3 and 4 should be turned on and then turned off in a predetermined order, and the light receiving units 5 and 6 should sense light in response to the turning on and off of the light emitting units 3 and 4

In this case, the time required for all the light emitting units 3 and 4 to be turned on and off is called a scan time.

SUMMARY

Embodiments of the present disclosure provide a technique capable of reducing the scan time of a large display system including a touch interface.

However, the embodiments of the present disclosure are not limited to those mentioned above. Other embodiments not mentioned may be clearly understood by those skilled in the art from the following description.

In accordance with a first aspect of the present disclosure, there is provided a method for a controlling touch display device. The method may be executed by a control apparatus. The method may include obtaining, when applications having a region within which the applications are overlapped with each other are displayed on the touch display device, information that one application of the applications is displayed to cover the other application of the applications or that said one application is displayed to be covered by the other application within the region; determining, based on the obtained information, touch sensing cycles for at least two touch sensors among a plurality of touch sensors embedded in the touch display device to be different from each other, each of said at least two touch sensors sensing a corresponding part within an entire region where the applications are displayed on the touch display device; and controlling each of said at least two touch sensors to perform a sensing operation based on its touch sensing cycle.

The determining may include, when said one application is displayed to cover the other application within the region, determining a touch sensing cycle for a sensor to sense a touch on a region where said one application is displayed but the other application is not displayed to be higher than a touch sensing cycle for a sensor to sense a touch applied to another region where the other application is displayed but said one application is not displayed.

The method may further include : determining a touch sensing cycle of a sensor to sense a touch applied to a region where no application is displayed, to be the lowest among the plurality of the touch sensors.

The method may further include : calculating, when said one application is displayed to cover a first application and a second application of the applications and the first application and the second application are displayed not to be overlapped with each other, areas of regions, respectively, where said one application covers each of the first application and the second application; and determining, based on the calculated areas, a touch sensing cycle for a touch sensor for a region where the first application is displayed to be different from a touch sensing cycle for a touch sensor for a region where the second application is displayed.

The method may further include : obtaining information on displayed regions in which each of at least two applications of the applications is displayed on the touch display device; obtaining respective center points of the displayed regions on a Cartesian coordinate system from the obtained information, the center points composed of x value and y value, respectively; determining respective movement amounts of said at least two applications so that x value of one center point among the center points is same as x value of another center point among the center points or y value of said one center point is same as y value of said another center point; and moving said at least one applications based on the calculated movement amount.

In accordance with a second aspect of the present disclosure, there is provided a control apparatus for controlling a touch display device. The control apparatus may include : a control unit configured to obtain, when applications having a region within which the applications are overlapped with each other are displayed on the touch display device, information that one application of the applications is displayed to cover the other application of the applications or that said one application is displayed to be covered by the other application within the region, and determine, based on the obtained information, touch sensing cycles for at least two touch sensors among a plurality of touch sensors embedded in the touch display device to be different from each other, each of said at least two touch sensors sensing a corresponding part within an entire region where the applications are displayed on the touch display device; and a driving unit configured to drive said at least two touch sensors based on the touch sensing cycles determined differently.

In accordance with a third aspect of the present disclosure, there is provided a touch display system. The touch display system may include a touch display device; a plurality of touch sensors sensing touches on the touch display device; and a control apparatus. The control apparatus may obtain, when applications having a region within which the applications are overlapped with each other are displayed on the touch display device, information that one application of the applications is displayed to cover the other application of the applications or that said one application is displayed to be covered by the other application within the region, determine, based on the obtained information, touch sensing cycles for at least two touch sensors among a plurality of touch sensors embedded in the touch display device to be different from each other, each of said at least two touch sensors sensing a corresponding part within an entire region where the applications are displayed on the touch display device, and control each of said at least two touch sensors to perform a sensing operation based on the touch sensing cycles determined differently.

According to one embodiment, the average value of the scan periods may be shortened. In this case, the refreshing timing of the touch display device may not be prolonged even in the large display system including a larger number of sensors than the related art. Thus, it is possible to suppress a decrease in the response speed of the touch display device.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

The terminologies to be described below are defined in consideration of functions of the embodiments of the present disclosure and may vary depending on a user's or an operator's intention or practice. Accordingly, the definition thereof may be made on a basis of the content throughout the specification.

Figure 1:
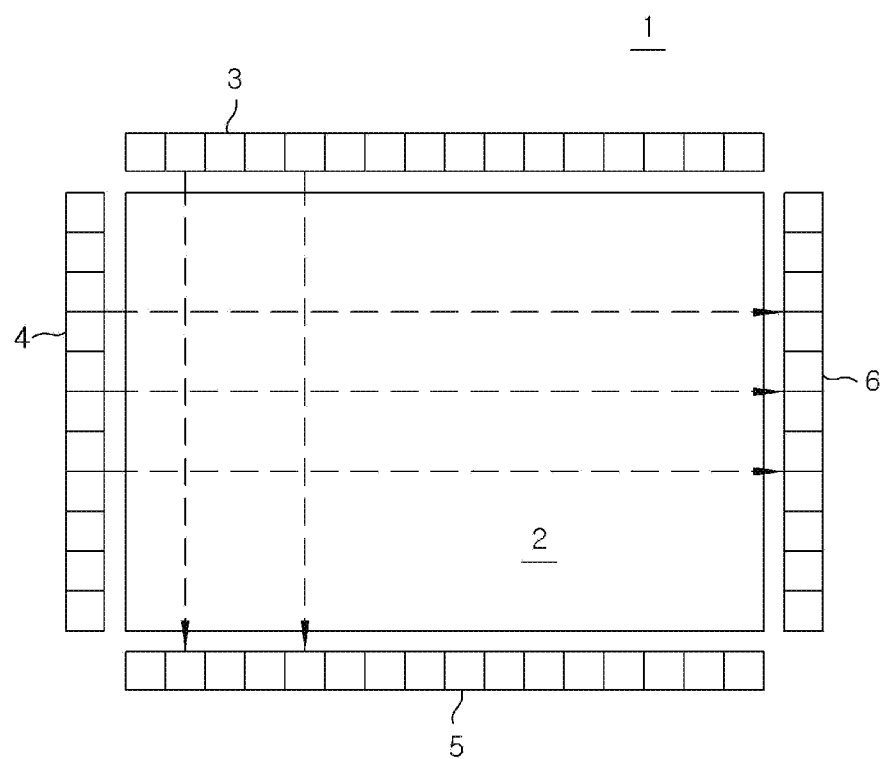
FIG. 1 is a view conceptually illustrating some components of a large display system including an LED type touch interface
Figure 2:
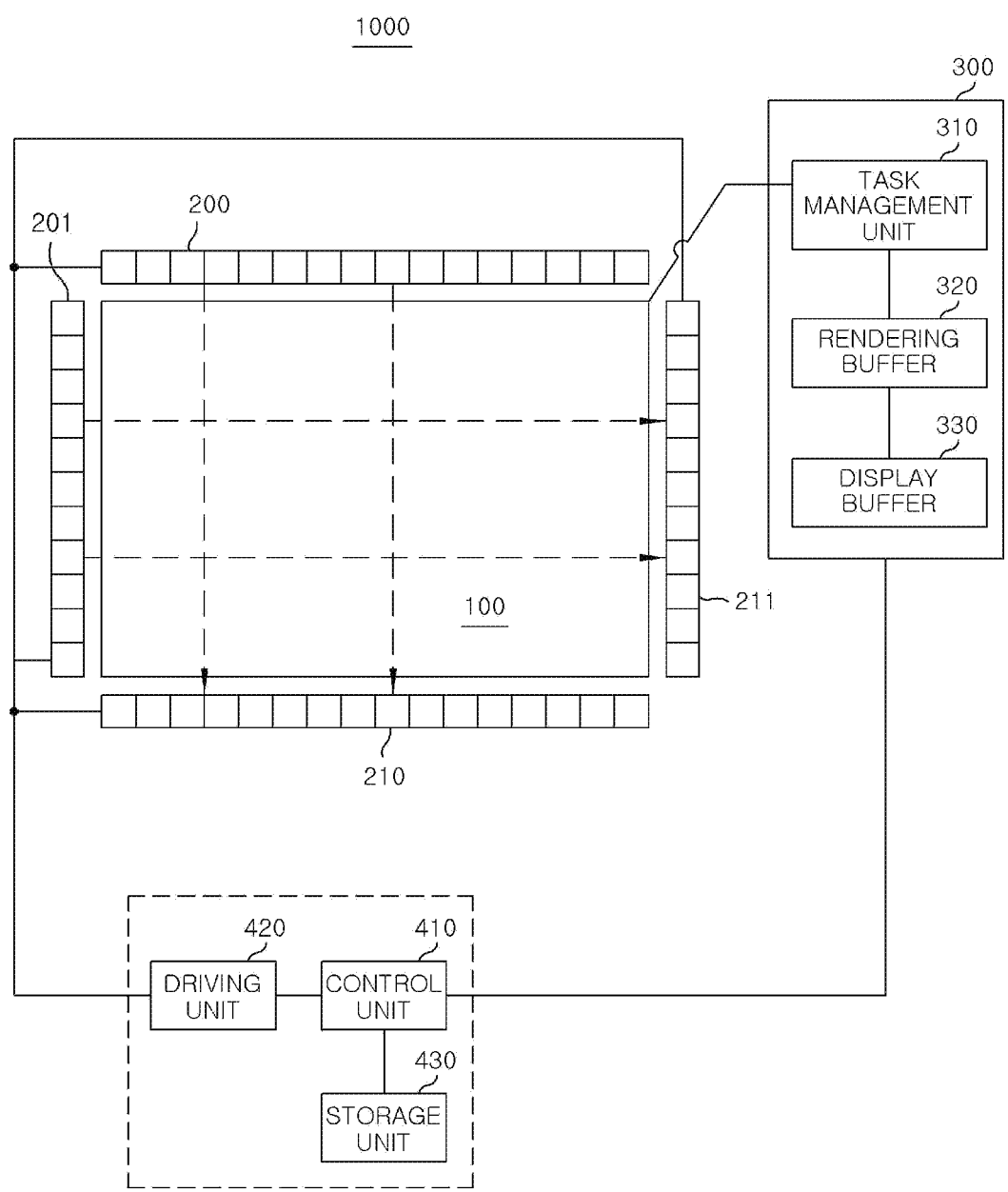
FIG. 2 is a view conceptually illustrating some components of a touch display system according to one embodiment.

FIG. 2 is a view conceptually illustrating some components of a touch display system according to one embodiment. However, FIG. 2 is exemplary. The spirit of the present disclosure is not limited to the touch display system illustrated in FIG. 2.

Referring to FIG. 2, the touch display system 1000 may include a touch display device 100, sensors including light emitting units 200 and 201 and light receiving units 210 and 211, an application management unit 300, and a control apparatus 400.

First, the touch display system 1000 may be implemented in the form of, for example, a wall display system or a tabletop display system. However, the present disclosure is not limited thereto. In addition, the touch display system 1000 may support a multitasking function. For example, in the touch display system 1000, a plurality of applications may be simultaneously executed. The touch display device 100 to be described below may simultaneously display the plurality of applications.

The touch display device 100 is configured to display an image or a video. Although not shown in the drawings, the touch display device 100 may include a panel (e.g., an LCD panel), a backlight unit (BLU), tempered glass, and the like. In this regard, a plurality of panels connected to each other on a plane may be included in the touch display device 100. If the number of panels to be connected is larger than a predetermined number, the touch display device 100 may be classified as a large display device. For example, the touch display device 100 may be formed by connecting eight conventional LCD panels, such as 55 inch panels, on a plane. In this regard, the structure in which the panel, the backlight unit, the tempered glass and the like are mounted on the touch display device 100 and the functions of the respective components are already known in the art. Therefore, the detailed description thereof will be omitted.

The sensors are configured to sense a touch applied to the touch display device 100, and serves as a touch interface in the touch display system 1000. Such sensors may include light emitting units 200 and 201 and light receiving units 210 and 211.

The light emitting units 200 and 201 may include a plurality of LEDs in a type of an array of LED. The light emitting units 200 and 201 may be disposed in a transverse direction 200 and a longitudinal direction 201 of the touch display device 100, respectively. In this regard, the LEDs may be LEDs for emitting infrared rays.

The light receiving units 210 and 211 may include an array of infrared sensors (detectors) for sensing light, for example, infrared rays emitted from the LEDs, and may be disposed in a transverse direction 210 and a longitudinal direction 211 of the touch display device 100, respectively.

In this regard, it is exemplary that as illustrated in FIG. 2, the light emitting units 200 and 201 are disposed at the top and left sides of the touch display device 100, and the light receiving units 210 and 211 are disposed at the bottom and right sides of the touch display device 100.

Hereinafter, the sensors may refer to the LEDs of the light emitting units 200 and 201. Alternatively, the sensors may collectively refer to the LEDs and the infrared sensors of the light receiving units 210 and 211 paired with the LEDs. In this case, the sensors are regarded as being provided in a plural number because, as described above, the light emitting units 200 and 201 and the light receiving units 210 and 211 may include a plurality of infrared LEDs and a plurality of infrared sensors, respectively. The sensing function of the plurality of sensors may be controlled by the control apparatus 400, which will be described later.

The application management unit 300 is configured to manage at least one application displayed on the touch display device 100. The application management unit 300 may be implemented by a memory and a microprocessor.

The application management unit 300 will be described in more detail. The application management unit 300 may include a task management unit 310, a rendering buffer 320 and a display buffer A 330.

The task management unit 310 is configured to manage each of a plurality of applications executed in the touch display system 1000.

The rendering buffer 320 is configured to render each of the plurality of applications described above. In this regard, ranking information on layers may be allocated to the rendered applications. The layers refer to layers in which the applications are displayed on the touch display device 100. The ranking of the layers is related to the form in which the applications are displayed on the touch display device 100. For example, when a plurality of applications are displayed on the touch display 100 to overlap each other, i.e., when one application is displayed to be covered by another application, the ranking of the layer where the covering application is displayed may be higher than the ranking of the layer where the covered application is displayed.

The display buffer A 330 may store a plurality of applications rendered by the rendering buffer 320. In this case, the plurality of the applications may be stored in the display buffer A 330 in consideration of the ranking information of the layers allocated to the respective applications and the positions where the respective applications are to be displayed on the touch display device 100.

In this regard, the ranking information of the layers allocated to the respective applications and the positions where the respective applications are to be displayed on the touch display device 100 may have been transmitted from the application management unit 300 to the control apparatus 400.

The control apparatus 400 may control the sensing operation of the plurality of sensors, or may adjust the positions of the applications displayed on the touch display device 100. The control apparatus 400 may be implemented by a memory configured to store instructions for performing the functions described below and a microprocessor configured to execute the instructions.

The control apparatus 400 will be described in more detail. The control apparatus 400 may include a control unit 410 and a driving unit 420, and may further include a storage unit 430 in some embodiments. However, the configuration of the control apparatus 400 shown in FIG. 2 is exemplary. Therefore, the configuration of the control apparatus 400 is not limited to the configuration shown in FIG. 2.

First, the storage unit 430 may store data. The storage unit 430 may store the touch sensing cycles of the respective sensors, the ranking information of the layers allocated to the respective applications, or the information on the positions where the applications are to be displayed on the touch display device 100. In this regard, the touch sensing cycles may be different for the respective sensors. In addition, the touch sensing cycles stored in the storage unit 430 may be updated. The determining or updating of the touch sensing cycles may be performed by the control unit 410, which will be described in detail later.

Next, the driving unit 420 will be described. The driving unit 420 is connected to the respective sensors to individually drive the sensors. The driving unit 420 may sequentially or simultaneously drive all or a part of the LEDs included in the light emitting units 200 and 201. In addition, the driving unit 420 may sequentially or simultaneously drive all or a part of the infrared sensors included in the light receiving units 210 and 2110 in some embodiments. The driving unit 420 may be a switching device, but is not limited thereto. In addition, the driving unit 420 drives the respective sensors under the control of the control unit 410. The control unit 410 will be described below.

The control unit 410 may determine the touch sensing cycle for each of the sensors. At this time, before a touch is sensed, the control unit 410 determines the touch sensing cycles of all of the sensors to a predetermined smallest value. Then, after a touch is sensed, the touch sensing cycle of each of the sensors may be adjusted as follows. For example, after a touch is sensed, a touch sensing cycle may be adjusted relatively high for a sensor in a specific region, and a touch sensing cycle may be adjusted relatively low for a sensor in another region.

The ranking information of the layers allocated to the above-described applications and/or the information on the regions in which the respective applications are displayed on the touch display device 100 may be considered in determining the touch sensing cycles. To this end, the ranking information of the layers in which the applications are displayed or the information on the regions of the applications may have been transmitted from the application management unit 300 to the control unit 410 as described above.

Various embodiments may exist in the method in which the control unit 410 determines the touch sensing cycles based on the ranking information of the layers and/or the information on the regions in which the respective applications are displayed on the touch display device 100. These embodiments will be described below.

As a first embodiment, description will be made on a case where the applications are located on different layers, i.e., a case where the applications are displayed on the touch display device 100 to overlap each other. The control unit 410 may determine the touch sensing cycle of the sensor for sensing a touch applied to a region where the application in an upper layer is displayed but the application in a lower layer is not displayed to be higher than the touch sensing cycle of the sensor for sensing a touch applied to a region where the application in the lower layer is displayed but the application in a higher layer is not displayed..

In addition, the control unit 410 may determine the touch sensing cycle of the sensor for sensing a touch applied to a region where the applications overlap each other to be the same as the touch sensing cycle of the sensor for sensing the touch of the region where the application in the upper layer is displayed but the application in the lower layer is not displayed.

Figure 3:
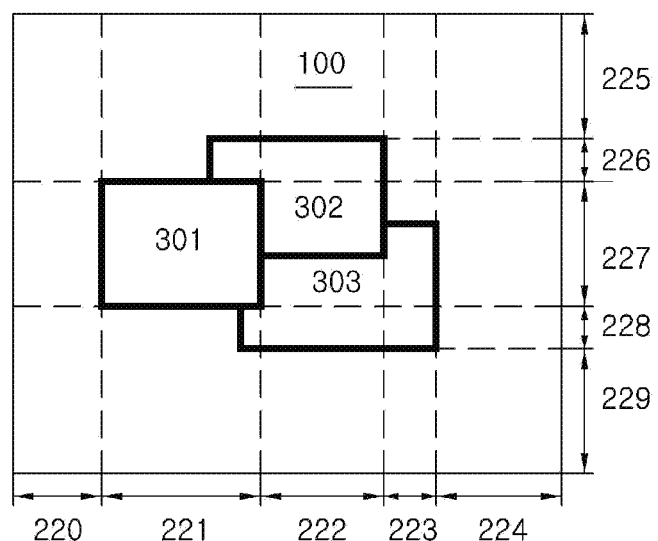
FIG. 3 is a view conceptually illustrating a plurality of applications overlapping with each other on the touch display device illustrated in FIG. 2.

The first embodiment is shown in FIG. 3. Referring to FIG. 3, a first application 301, a second application 302 and a third application 303 are displayed on the touch display device 100. In FIG. 3, the first application 301 covers the second application 302 in the region where the first application 301 overlaps the second application 302. In addition, the second application 302 covers the third application 303 in the region where the second application 302 overlaps the third application 303. Therefore, the ranking of the layers allocated to the respective applications is highest in the first application 301 and lowest in the third application 303.

In this case, the control unit 410 may determine the touch sensing cycles of the respective sensors to decrease in the following order, i.e., in a descending order.

Touch sensing cycles of the sensors arranged in the transverse direction: Sensor for scanning a region of identification number 221>Sensor for scanning a region of identification number 222>Sensor for scanning a region of identification number 223 Touch sensing cycles of the sensors arranged in the longitudinal direction: Sensor for scanning a region of identification number 227>Sensor for scanning a region of identification number 226>Sensor for scanning a region of identification number 228

In this regard, if the touch sensing cycle of the sensor for scanning the region of identification number 221 is 100 times per minute, the touch sensing cycle of the sensor for scanning the region of identification number 222 may be determined to 80 times per minute, and the touch sensing cycle of the sensor for scanning the region of identification number 223 may be determined to 60 times per minute. However, these numerical values are exemplary.

According to this, the touch sensing cycle of the sensor for sensing the touch of the application located in the higher layer may be determined to be higher than the touch sensing cycle of the sensor for sensing the touch of the application located in the lower layer.

In this case, the average value of the aforementioned scan periods when the touch sensing cycles are different may be smaller than that when the touch sensing cycles are the same. The average value of the scan periods will be described with reference to FIGS. 4 and 5.

Figure 4:
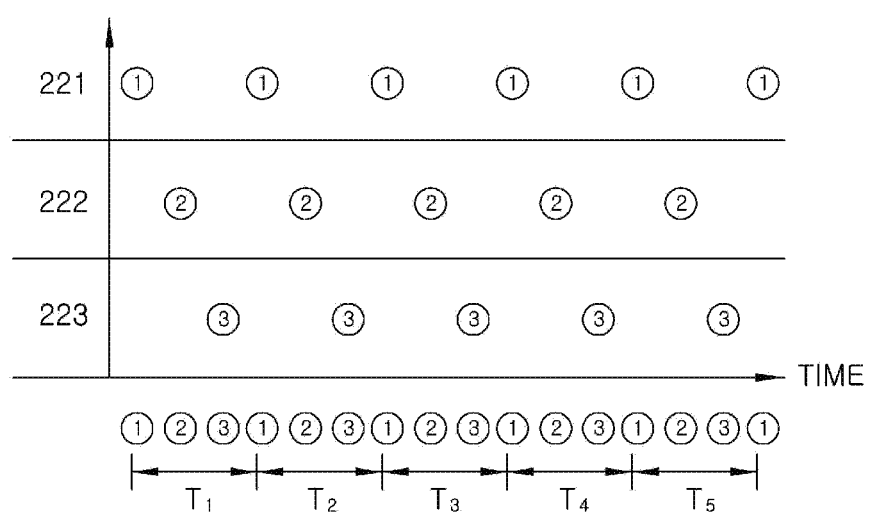
FIG. 4 illustrates a result of deriving scan periods for the respective sensors under the assumption that the touch sensing cycles are determined to be the same.

FIG. 4 illustrates a result of deriving scan periods for the respective sensors shown in FIG. 3 under the assumption that the touch sensing cycles are the same. In FIG. 4, identification numbers 221, 222 and 223 designate the sensors for sensing touches in the regions indicated by the identification numbers in FIG. 3, respectively. In addition, the horizontal axis in FIG. 4 means the time. In FIG. 4, the number in a circle indicates a situation in which the sensor is turned on.

Referring to FIG. 4, the sensors of identification numbers 221, 222 and 223 are sequentially turned on one by one. That is, when ① denotes the sensor of identification number 221, ② denotes the sensor of identification number 222, and ③ denotes the sensor of identification number 223, the LEDs may be turned on over time in the order of '①②③①②③①②③①②③①②③①②③①②③①...'.

In addition, identification numbers T1 to T5 represent scan periods, respectively. In the following description, the scan period is defined as the time required for the LED which is most-frequently turned on, i.e., the LED which has the highest touch sensing cycle, to be turned on, turned off and then turned on again. The average value of the scan periods T1 to T5 is equal to T1. This is because the touch sensing cycles of the respective sensors are the same. That is, all the sensors sense a touch in every scan period.

Figure 5:
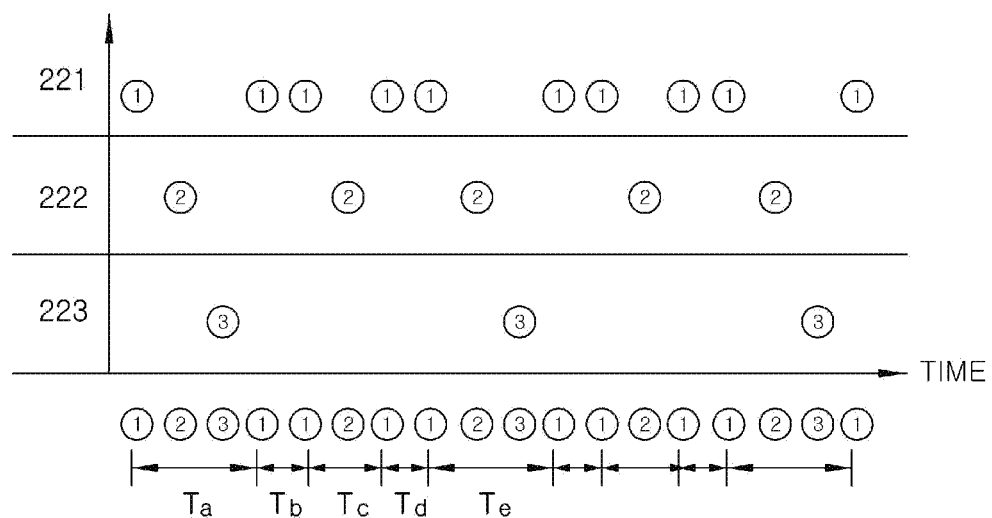
FIG. 5 illustrates a result of deriving scan periods for the respective sensors under the assumptions that the touch sensing cycles are determined to be different.

On the other hand, FIG. 5 illustrates scan periods under the assumption that the touch sensing cycles of the respective sensors are different from each other in FIG. 3. Since the touch sensing cycles of the respective sensors are different from each other in the case of FIG. 5, the LED denoted by ① is turned on every scan period, but the LED denoted by ② or ③ is not turned on every scan period. The LEDs may be turned on over time in the order of '①②③①①②①①②③①①②①①②③①①②...'.

In addition, if the time required for the LED denoted by ① to be turned on, turned off and then turned on again is defined to be a scan period, identification numbers Ta to Te in FIG. 5 indicate scan periods. The average value of the scan periods Ta to Te is smaller than Ta and, therefore, smaller than T1 in FIG. 4. This is because, in the case of the plurality of sensors, the sensor of identification number 221 is turned on every scan period, but the remaining sensors are not turned on every scan period.

That is, according to one embodiment, the average value of the scan periods may be shorter than that of the related art. In this case, even in a large display system including a larger number of sensors than the related art, the refreshing timing of the touch display device may not be prolonged. Thus, it is possible to suppress a decrease in the response speed of the touch display device.

Referring back to FIG. 3, the control unit 410 may determine a touch sensing cycle of the sensor for sensing a touch of a region where the application is not displayed, to be smallest among the touch sensing cycles of the plurality of sensors. For example, the control unit 410 may set the touch sensing cycle of the sensors disposed in the regions denoted by identification numbers 220 and 224 in FIG. 3, to be smaller than the touch sensing cycles of the sensors disposed in other regions.

Figure 6:
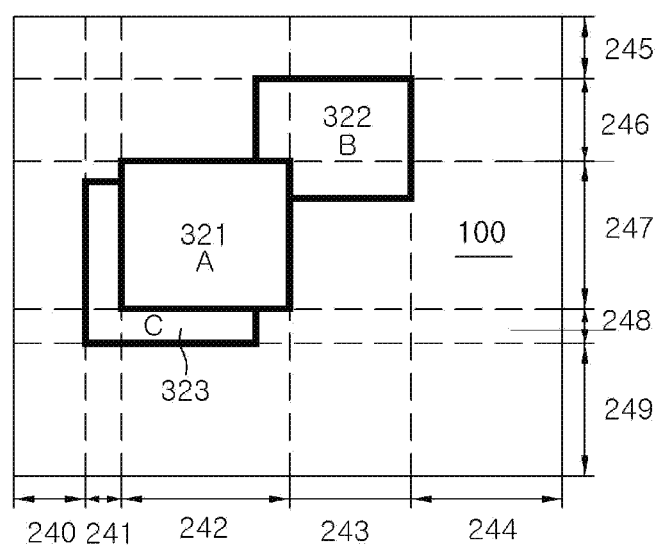
FIG. 6 is a view conceptually illustrating a plurality of applications overlapping with each other on the touch display device illustrated in FIG. 2.

Next, a second embodiment will be described with reference to FIG. 6. In FIG. 6, the application A 321 is an application disposed in an upper layer, and the application B 322 and the application C 323 are applications disposed in a layer having the same ranking lower than the ranking of the application A 321. In this case, according to the first embodiment, the touch sensing cycles of the application B 322 and the application C 323 determined by the control unit 410 is lower than the touch sensing cycle of the application A 321.

In this case, according to the second embodiment, the control unit 410 may make the touch sensing cycles of the application B 322 and the application C 323 different from each other. To this end, the control unit 410 may calculate an area of the region where the application A 321 overlaps the respective applications B 322 and C 323. In addition, the control unit 410 may calculate a ratio of the area of the region where the application B 322 overlaps the application A 321 to the area of the application B 322, and may also calculate a ratio of the area of the region where the application C 323 overlaps the application A 321 to the area of the application C 323. The control unit 410 may determine the touch sensing cycle of the application having a relatively high calculated ratio to be lower than the touch sensing cycle of the application having a relatively low calculated ratio. In the case of FIG. 6, the overlapping ratio of the application B 322 is lower than that of the application C 323. Therefore, the control unit 410 may determine the touch sensing cycle of the application B 322 to be higher than the touch sensing cycle of the application C 323.

That is, in one embodiment, under the premise that the application having a large overlapping ratio is far from the user's interest, a sensing operation may be performed at a low cycle for a touch applied to such an application. On the other hand, under the premise that the application having a small overlapping ratio is closer to the user's interest, a sensing operation may be performed at a high cycle for a touch applied to such an application.

A third embodiment will be described with reference to FIGS. 7 to 9. The application A 330 and the application B 331 illustrated in FIG. 7 may be applications disposed in the uppermost layer. The same applies to FIGS. 8 and 9.

Figure 7:
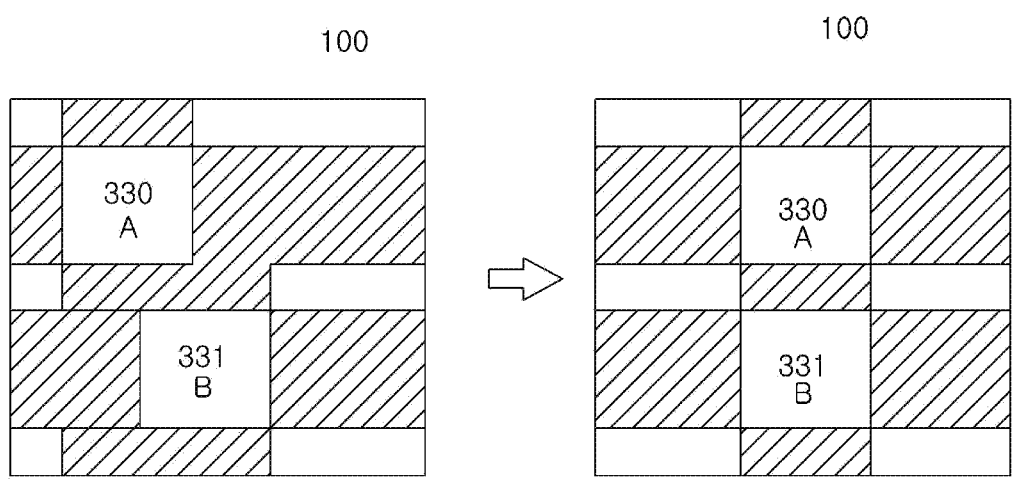
FIG. 7 is a view conceptually illustrating a change of a position displayed for a plurality of applications on the touch display device illustrated in FIG. 2.
Figure 8:
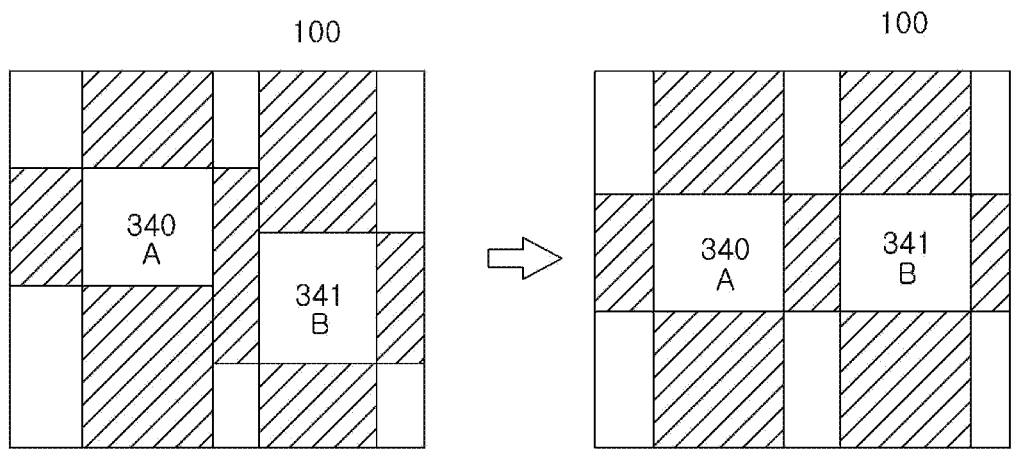
FIG. 8 is a view conceptually illustrating a change of a position displayed for a plurality of applications on the touch display device illustrated in FIG. 2.
Figure 9:
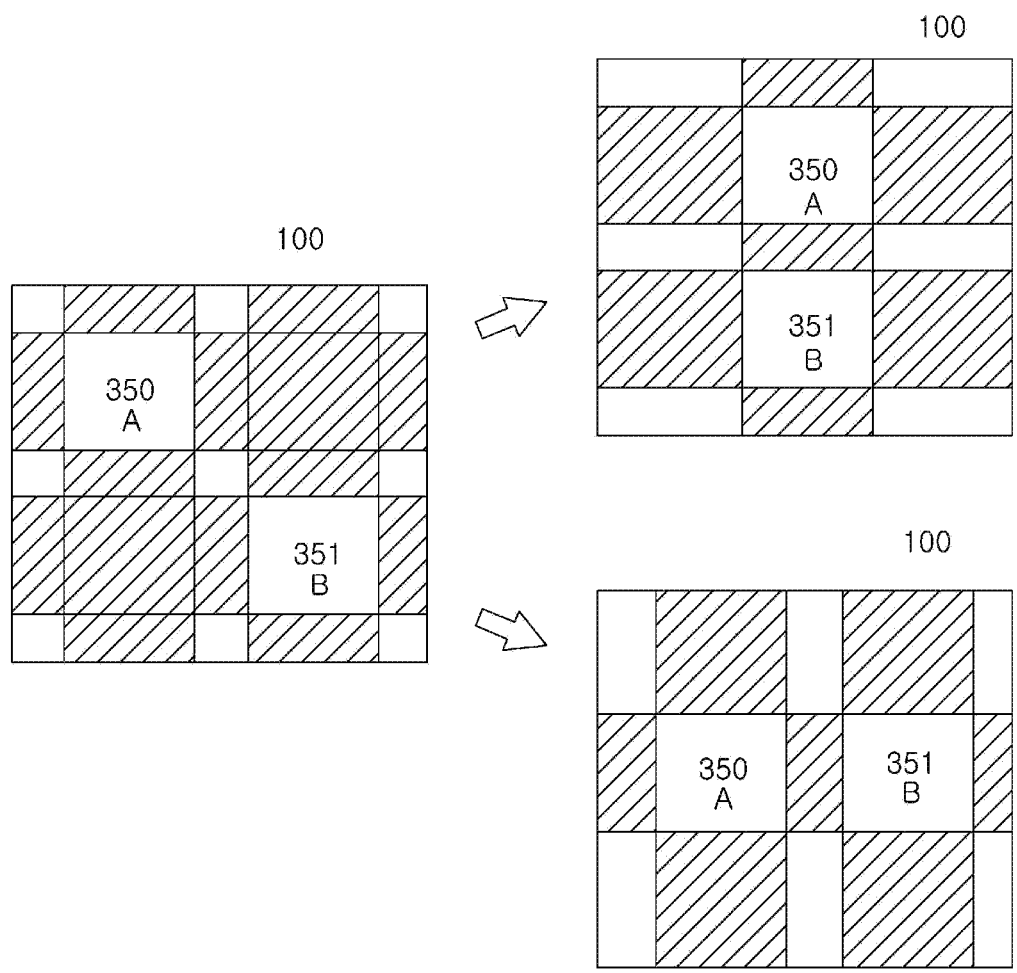
FIG. 9 is a view conceptually illustrating a change of a position displayed for a plurality of applications on the touch display device illustrated in FIG. 2.

In FIGS. 7 to 9, the hatched portions represent regions sensed by the sensors having a relatively high touch sensing cycle among the sensors for sensing touches applied to the respective applications, and the portions with no hatching represent regions sensed by the sensors having a relatively low touch sensing cycle. More hatched portions mean more sensors having a relatively high touch sensing cycle. Therefore, in order to make the above-mentioned average value of the scan periods relatively small, the hatched portions should be reduced and the portions with no hatching should be increased. To this end, the control unit 410 may adjust the arrangement positions of the applications to reduce the area of the hatched portions. This may mean that the number of sensors to be used for sensing touches applied to the respective applications is minimized.

In order to reduce the area of the hatched portions, the positions of the applications may be changed as shown in FIGS. 7 to 9. For example, as shown in FIG. 7, only the positions of the application A 330 and the application B 331 in the transverse direction may be changed without changing the positions thereof in the longitudinal direction. In this case, the movement amounts or the movement positions of the application A 330 and the application B 331 may be determined so as to maximize the region where the application A 330 and the application B 331 overlap each other in the longitudinal direction. The movement positions may be, for example, average positions seen in the transverse direction with respect to the center point of each of the application A 330 and the application B 331. However, the present disclosure is not limited thereto.

Alternatively, as shown in FIG. 8, only the positions of the application A 340 and the application B 341 in the longitudinal direction may be changed without changing the positions thereof in the transverse direction. In this case, the movement amounts or the movement positions of the application A 340 and the application B 341 may be determined so as to maximize the region where the application A 340 and the application B 341 overlap each other in the transverse direction. The movement positions may be, for example, average positions seen in the longitudinal direction with respect to the center point of each of the application A 340 and the application B 341. However, the present disclosure is not limited thereto.

Alternatively, as shown in FIG. 9, the positions of the application A 350 and the application B 351 in both the transverse direction and the longitudinal direction may be changed. In this case, the movement amounts or the movement positions of the application A 350 and the application B 351 may be determined so as to maximize the region where the application A 350 and the application B 351 overlap each other in the transverse direction and the longitudinal direction. The movement positions may be, for example, average positions seen in the transverse direction and the longitudinal direction with respect to the center point of each of the application A 350 and the application B 351. However, the present disclosure is not limited thereto.

In this case, as shown in FIG. 9, each of the application A 350 and the application B 351 may be aligned in the transverse direction or in the longitudinal direction and may be displayed on the touch display device 100.

Figure 10:
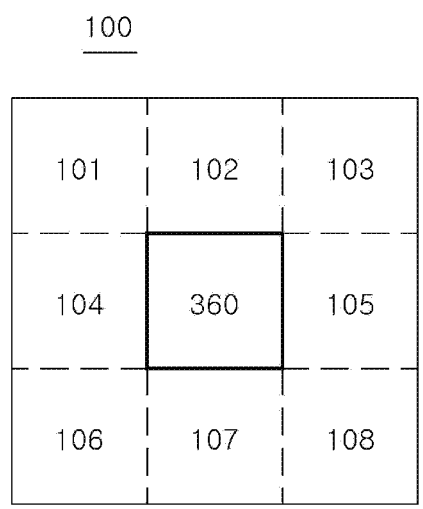
FIG. 10 is a view conceptually illustrating a determination of a display location for a new application on the touch display device 100

A fourth embodiment will be described with reference to FIG. 10. FIG. 10 illustrates that the application 360 located in the uppermost layer is displayed on the touch display device 100. When a new application or a pop-up window is to be displayed, the control unit 410 may determine the position thereof so as to minimize the number of sensors to be used for sensing touches applied to the existing application 360 and the new application. In FIG. 10, when the new application is disposed in the region 102, 104, 105 or 107, it is possible to minimize the number of sensors to be used for sensing touches applied to the aforementioned applications. In addition, the control unit 410 may determine, as the aforementioned position, the regions 104 and 105 arranged side by side with the application 360 in the transverse direction among the regions 102, 104, 105 and 107. This is because, in consideration of the stature or arm length of the user who operates the touch display device 100, it may be more convenient for the user to arrange the new application side by side with the existing application 360 in the transverse direction.

Figure 11:
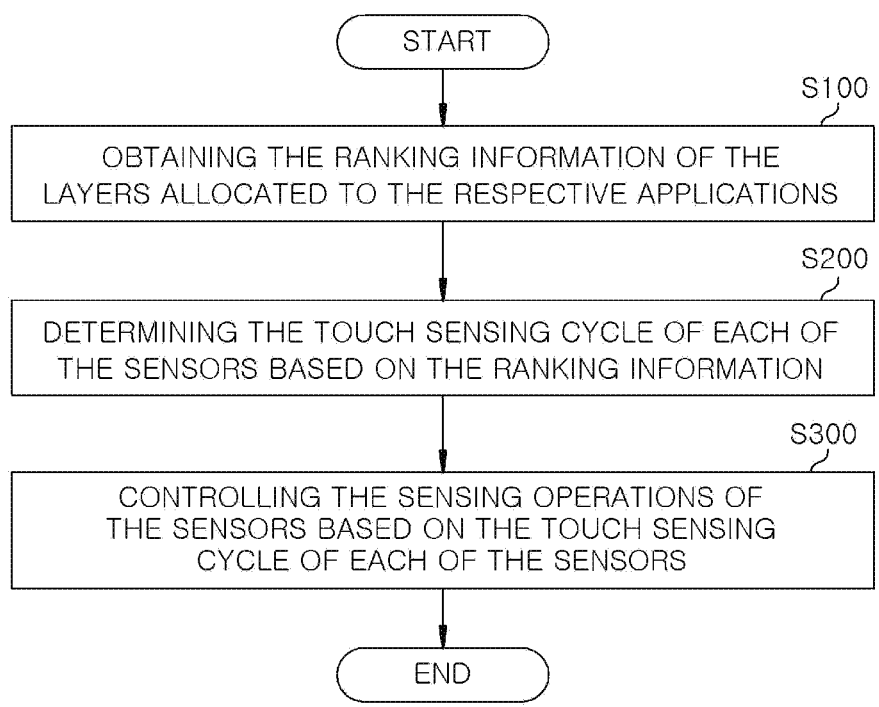
FIG. 11 is a view conceptually illustrating a method for touch display device according to one example.

FIG. 11 is a flowchart illustrating a method of controlling a touch display device according to one embodiment. The touch display device control method illustrated in FIG. 11 may be performed by the control apparatus 400 described above. The control method illustrated in FIG. 11 is exemplary. Therefore, the spirit of the present disclosure is not limited thereto.

Referring to FIG. 11, the control unit 410 of the control apparatus 400 may obtain ranking information of the layers allocated to the respective applications in respect of the applications displayed on the touch display device 100 (S100). Such ranking information may be obtained from the application management unit 300.

Based on the obtained ranking information of the layers, the control unit 410 may determine the touch sensing cycle of the sensor for sensing a touch of the application located in the upper layer among the sensors provided in the touch display device 100, to become higher than the touch sensing cycle of the sensor for sensing a touch of the application located in the lower layer (S200). In addition, the control unit 410 may determine the touch sensing cycle of the sensor for sensing a touch of the region where these applications overlap each other, to coincide with the touch sensing cycle of the sensor for sensing a touch of the application located in the upper layer.

Next, the driving unit 420 of the control apparatus 400 may control the sensing operations of the sensors based on the touch sensing cycle determined for each of the sensors (S300). In this case, as described above, the average value of the scan periods may be shortened than the related art. Therefore, even in a large display system including a larger number of sensors than the related art, the refreshing timing of the touch display device may not be prolonged. Thus, it is possible to suppress a decrease in the response speed of the touch display device.

On the other hand, the control unit 410 may differently determine the ranking information for a plurality of applications arranged in the lower layer than the application disposed in the upper layer and having the same ranking information. For example, based on the area over which the application disposed in the lower layer and the application disposed in the higher layer overlap with each other, the control unit 410 may determine the touch sensing cycle to become higher as the percentage of the area grows smaller.

In addition, the control unit 410 may change the positions of the plurality of applications arranged in the uppermost layer. In this case, the control unit 410 may change the positions of the applications so as to minimize the number of sensors for sensing touches applied to the respective applications. Since the detailed method thereof has been described above, additional description will be omitted.

In addition, the control unit 410 may determine a position of a new application or the like other than the applications already displayed on the touch display device 100 when there is a need to display the new application or the like. In this case, the control unit 410 may change the positions of the applications so as to minimize the number of sensors for sensing touches applied to the respective applications. Since the detailed method thereof has been described above, additional description will be omitted.

As described above, those skilled in the art will understand that the present disclosure can be implemented in other forms without changing the technical idea or essential features thereof. Therefore, it should be understood that the above-described embodiments are examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

INDUSTRIAL APPLICABILITY

According to one embodiment, the average value of the scan periods may be shortened. In this case, the refreshing timing of the touch display device may not be prolonged even in the large display system including a larger number of sensors than the related art. Thus, it is possible to suppress a decrease in the response speed of the touch display device.

What is claimed is:

1. A method for a controlling touch display device, the method using a control apparatus, comprising:
   obtaining, when applications having a region within which the applications are overlapped with each other are displayed on the touch display device, information that one application of the applications is displayed to cover the other application of the applications or that said one application is displayed to be covered by the other application within the region;
   determining, based on the obtained information on an overlapping relation between the applications, touch sensing cycles for at least two touch sensors among a plurality of touch sensors embedded in the touch display device to be different from each other, each of said at least two touch sensors sensing a corresponding part within an entire region where the applications are displayed on the touch display device; and
   controlling each of said at least two touch sensors to perform a sensing operation based on its touch sensing cycle.

2. The method of claim 1, wherein said determining comprises, when said one application is displayed to cover the other application within the region, determining a touch sensing cycle for a sensor to sense a touch on a region where said one application is displayed but the other application is not displayed to be higher than a touch sensing cycle for a sensor to sense a touch on another region where the other application is displayed but said one application is not displayed.

3. The method of claim 1, further comprising:
   determining a touch sensing cycle of a sensor to sense a touch applied to a region where no application is displayed, to be the lowest among the plurality of the touch sensors.

4. The method of claim 1, further comprising:
   calculating, when said one application is displayed to cover a first application and a second application of the applications and the first application and the second application are displayed not to be overlapped with each other, areas of regions, respectively, where said one application covers each of the first application and the second application; and
   determining, based on the calculated areas, a touch sensing cycle for a touch sensor for a region where the first application is displayed to be different from a touch sensing cycle for a touch sensor for a region where the second application is displayed.

5. The method of claim 1, further comprising:
   obtaining information on displayed regions in which each of at least two applications of the applications is displayed on the touch display device;
   obtaining respective center points of the displayed regions on a Cartesian coordinate system from the obtained information, the center points composed of x value and y value, respectively;
   determining respective movement amounts of said at least two applications so that x value of one center point among the center points is same as x value of another center point among the center points or y value of said one center point is same as y value of said another center point; and
   moving said at least one applications based on the calculated movement amount.

6. A control apparatus for controlling a touch display device, the control apparatus comprising:
   a control unit configured to:
      obtain, when applications having a region within which the applications are overlapped with each other are displayed on the touch display device, information that one application of the applications is displayed to cover the other application of the applications or that said one application is displayed to be covered by the other application within the region, and
      determine, based on the obtained information on an overlapping relation between the applications, touch sensing cycles for at least two touch sensors among a plurality of touch sensors embedded in the touch display device to be different from each other, each of said at least two touch sensors sensing a corresponding part within an entire region where the applications are displayed on the touch display device, and
   a driving unit configured to drive said at least two touch sensors based on the touch sensing cycles determined differently.

7. A touch display system, the touch display system comprising:
   a touch display device;
   a plurality of touch sensors sensing touches on the touch display device; and
   a control apparatus configured:
      to obtain, when applications having a region within which the applications are overlapped with each other are displayed on the touch display device, information that one application of the applications is displayed to cover the other application of the applications or that said one application is displayed to be covered by the other application within the region,
      to determine, based on the obtained information on an overlapping relation between the applications, touch sensing cycles for at least two touch sensors among a plurality of touch sensors embedded in the touch display device to be different from each other, each of said at least two touch sensors sensing a corresponding part within an entire region where the applications are displayed on the touch display device, and to control each of said at least two touch sensors to perform a sensing operation based on the touch sensing cycles determined differently.

* * * * *